April 2, 1940.                    J. H. EDWARDS                    2,195,451
                                WEIGHING APPARATUS
                              Filed Sept. 16, 1937
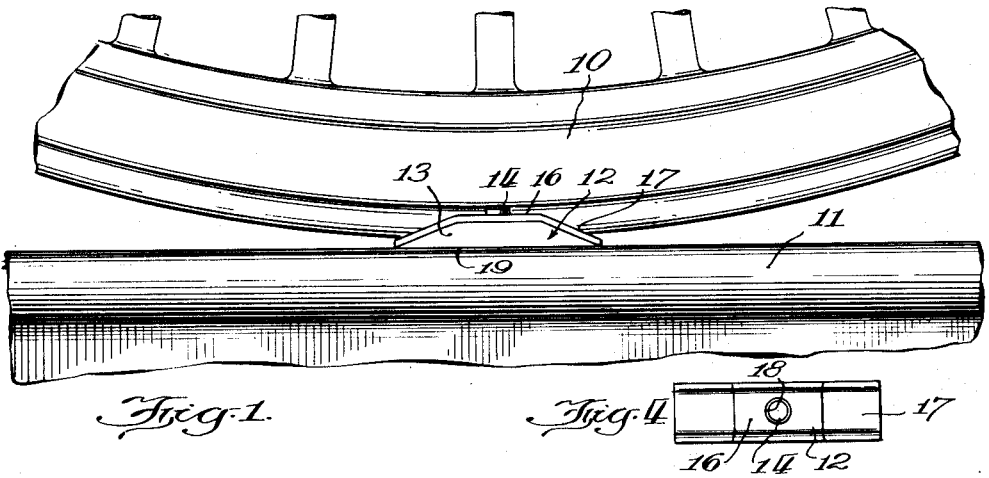
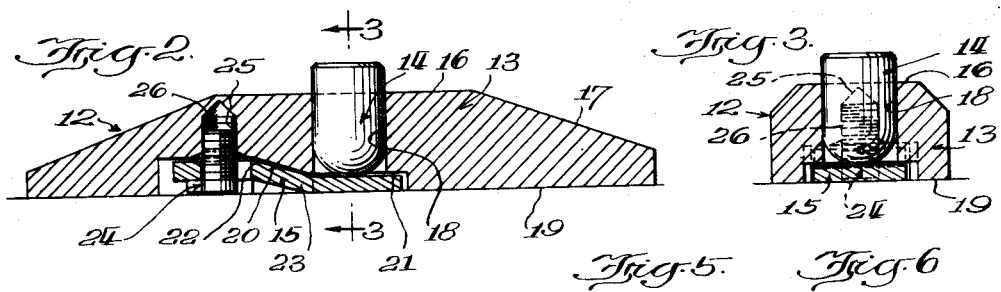
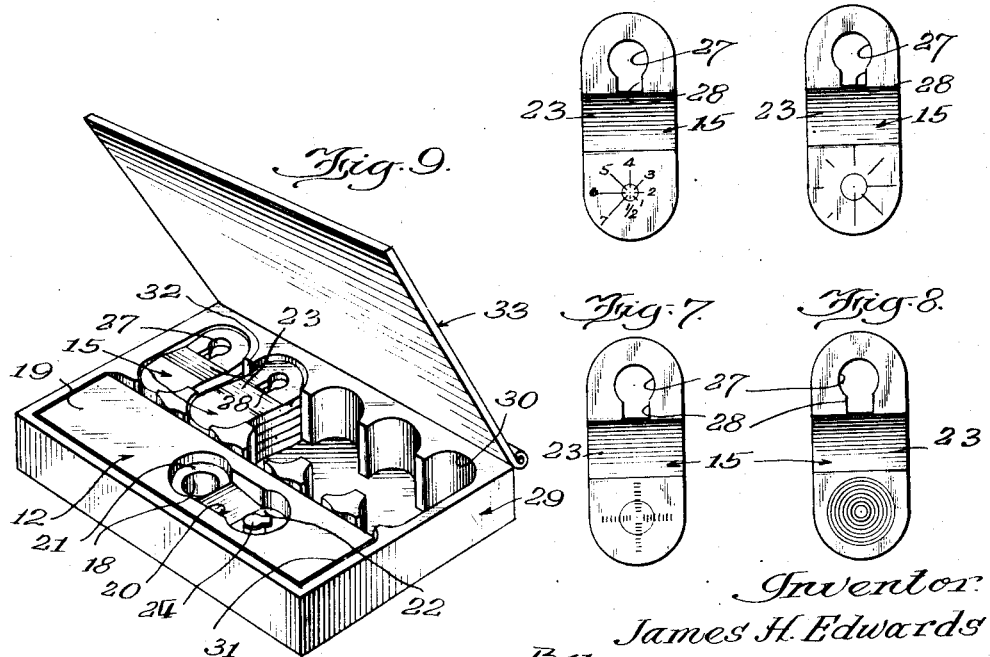
Inventor:
James H. Edwards
By Williams, Bradbury, McCaleb & Hinkle
Attys Patented Apr. 2, 1940

2,195,451

UNITED STATES PATENT OFFICE 2,195,451

WEIGHING APPARATUS

James H. Edwards, Evanston, Ill., assignor to Illinois Testing Laboratories, Inc., Chicago, Ill., a corporation of Illinois Application September 16, 1937, Serial No. 164,178

3 Claims. (Cl. 261—1)

The present invention relates to weighing and recording apparatus which are particularly adaptable to weighing things of great weight, such as freight cars, locomotives, highway trucks, cable strain, etc.

Railway locomotives very often become what are called "hard riders" due to the lack of proper distribution of weight upon the various wheels of the locomotive and so far as I am aware, there is no simple and economical way of determining the weight on the various wheels of a locomotive so that the distribution of weight may be properly adjusted. There is a demand also for a simple and economical device for determining the weight of highway trucks. In this case, the inspectors should have a device which can be carried and applied to any of the wheels of the vehicle to determine the load on that wheel and to provide a permanent record.

One of the objects of the invention is the provision of an improved apparatus for determining the weight of heavy bodies or the weight distribution on the various wheels of a locomotive or truck.

Another object of the invention is the provision of such an improved device which provides a permanent record of the test that was made upon the various vehicle wheels.

Another object of the invention is the provision of a testing device of the class described which may be conveniently carried about by inspectors or mechanics and which occupies little space.

Another object of the invention is the provision of a testing apparatus of the class described which is sufficiently accurate for the purpose of testing the load on highway truck wheels or the load on locomotive wheels.

Another object of the invention is the provision of improved test pieces for such a weight determining device, which test pieces are provided with a means for securing them in the testing device and with appropriate marking devices for indicating the load that has been placed upon the test piece.

Another object of the invention is the provision of an improved apparatus of the class described, which is simple, sturdy, accurate and economical so that the devices may be placed within the reach of a large number of users.

Other objects and advantages of the invention will be apparent from the following description and accompanying drawing, in which similar characters of reference indicate similar parts throughout the several views.

Referring to the drawing accompanying this specification,

Figure 1 is a fragmentary elevational view of a railway locomotive wheel and a testing device being used to determine the weight distribution on that wheel;

Fig. 2 is a vertical medial cross-sectional view taken through the testing device with the penetrator shown in elevation;

Fig. 3 is a vertical sectional view, taken on the plane of the line 3—3 of Fig. 2;

Fig. 4 is a top plan view of the testing device;

Fig. 5 is a top plan view of a test piece showing one form of marking indicia and an indentation which may indicate that a weight of 1000 pounds, for example, has been applied to the test piece;

Fig. 6 is a similar view of another test piece having a different form of marking and to which, for example, 2000 pounds may have been applied;

Fig. 7 is another similar view of another test piece with another form of making to which, for example, a weight of 3000 pounds may have been applied;

Fig. 8 is another similar view of another test piece with another form of marking and bearing the indication of the application of the weight, for example, of 4000 pounds;

Fig. 9 is a view in perspective of the housing for the test pieces and testing device in which a number of test pieces of different hardness may be housed.

Referring to Figure 1, 10 indicates the wheel of a locomotive and 11 indicates the rail of the track. 12 indicates in its entirety the testing device which comprises principally the supporting body 13, the penetrator plunger 14 and test piece 15. The supporting body 13 may consist of a steel body rectangular in plan as shown in Figure 2, and provided with a medial portion 16 of uniform thickness. Each end is provided with a sloping upper surface 17 in order that the wheel of the locomotive may ride up slowly on the testing device. The body 13 is provided with a cylindrical bore 18 located in the medial portion 16 and extending vertically with respect to the rail 11.

The lower flat surface 19 of the body is adapted to rest flatly on the rail, but is provided with a longitudinally extending groove 20 in the lower surface 19 communicating with and extending beyond the bore 18. The groove 20 is of slightly greater depth than test piece 15 at the portion 21 which is immediately below the plunger 14.

At the portion 22 of the groove, the groove 20 is made deeper in order to receive the offset portion 23 of the test piece 15 and to secure the test piece with sufficient space for a bolt head 24.

The body 13 is provided with a threaded bore 25 for receiving the bolt 26 which passes through a bore 27 in a test piece and is provided with a head 24. The head 24 merely consists of a lateral projection on the bolt 26 so that the head 24 is adapted to clear a slot 28 in the test piece when the head is turned into registration with the bore and slot 27, 28. The bolt 26 is threaded into the body 13 sufficiently so that its head clears the rail 11, but the test piece may be loosely mounted so that it rests flatly on the rail 11, being engaged by the plunger 14.

It is contemplated that the amount of elevation of the wheel 10 which is involved by rolling up on the testing device 12 which is shown in full size in Figure 2, will be taken up by the equalizing linkage so as to approximate a test of the actual load distribution on the wheels, but if desired, the rail 11 may be provided with a depression for receiving the testing device 12 so that the action of the equalizers is not required, and so that all of the wheels are at approximately the same level.

The test pieces may be made of any desirable hardness and may be made of any of the suitable metals, alloys or alloy steels, such as carbon steel, molybdenum steel, chromium steel, tungsten steel, ordinary cold roll steel or tool steel. The hardness will depend upon the size of the penetrator point and its shape, and the amount of weight to be applied to the test piece and the user may be provided with a cast aluminum box 29 having suitable sockets 30 for a series of test pieces and a socket 31 for the testing device.

The test pieces may be made oval in shape being provided with circular ends and parallel sides, and since each has the same offset, they will nest against each other when placed in the sockets 30 of similar shape. The space 32 between the sockets serves conveniently for receiving the fingers and permitting the removal of the test pieces.

Since the testing device 12 is placed in its housing upside down, it is a simple matter to press on either end of it thereby rocking the other end upward so that it may be grasped with the fingers. The complete assembly may be secured in its housing by a suitable cover 33 with a convenient form of fastening device.

It is to be understood that each series of test pieces will have upon it appropriate markings indicating the pounds or tons which may be weighed with these test pieces, and in addition to that, they may have the various types of markings such as shown in Figures 5 to 8. In Figure 5, for example, the test piece 15 is provided with a plurality of radial lines extending outward to predetermined points, and the outer end of each line, determines a certain weight. The depression which has been formed in the test piece 15 of Figure 5 might, for example, indicate that a weight of 1000 pounds was applied to this test piece, and the second line toward the right, might have indicia of 1000 pounds. Thus, the other lines may have also suitable indicia of 2, 3, 4, 5 and 6 indicating in thousands of pounds the weight when the depression coincides with the end of the line in question.

In Figure 6, the inner end of each line is used to make a determination of weight. In Figure 7, I have shown lines tangent to circles at predetermined radii from the center, which may also be provided with suitable indicia. In Figure 8, I have shown a plurality of concentric circles which by their coincidence with the edge of the depression may indicate a predetermined weight.

Aside from the provision of indicia and markings on the test pieces, the depth and/or area of a depression may be measured by means of micrometers or depth gauges in the usual way, and a determination of weight made by means of suitable instructions provided with the test pieces.

The penetrator plunger 14 comprises a simple cylindrical hardened steel member which is provided with a spherical lower end and may also have weight indicating indicia, the imprint of which designates the depth of depression and weight carried to cause same. It is so hard that it is not affected by the application of weight, but it is adapted to make a depression in the test piece which is of relatively softer material.

It will thus be observed that I have invented an improved apparatus for the determination of weight. The principle of my invention consists primarily in the provision of a test piece of predetermined hardness and the application of the weight to a penetrator of predetermined shape and superior hardness in such manner that a depression of predetermined shape is formed in the test piece. It further comprises the measurement and determination of the weight by comparison of the depression in the test piece with other calibrated depressions or data.

In this manner, the weight of every load carried by a crane may be determined. The weight of the load on a highway truck wheel may be very quickly determined so that the truck may be ruled off the highway by inspectors without the necessity of jacking up the truck or taking the truck to a weighing scale.

The weight distributed among the various wheels of a locomotive may be determined and adjustments made so that the weight is properly distributed and a record kept so as to show the proper distribution of the weight. It will be no longer necessary to permit weight distribution on locomotive wheels to be wrong since a simple and economical mode of determining the weight is provided by this apparatus.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention what I claim as new and desire to secure by Letters Patent of the United States, is:

1. In a weight-determining device for locomotives, the combination of a hardened metal body provided with a guide bore and having sloping surfaces at its ends to permit the rolling of a wheel on said body, with a penetrator plunger of hardened metal slidably mounted in said bore and projecting from the top of said bore, said plunger being formed with a partially spherical surface at its lower end, and said body having a recess in its lower end communicating with said bore, with a test piece housed in said recess, said test piece comprising a metal strip of predetermined hardness formed with an offset intermediate its ends and provided with an aperture at the end spaced from said plunger, and a threaded member located in a threaded bore in said body and having a head, said head and the offset end of said test piece being housed in said recess, and the opposite end of said test piece extending under said plunger and being adapted to rest against a rail, whereby the rolling of a wheel of a locomotive on the projecting end of said plunger will produce a predetermined deformation in said test piece which is an indication of the applied weight of the locomotive at said wheel.

2. In a weight-determining device for locomotives, the combination of a hardened metal body provided with a guide bore and having sloping surfaces at its ends to permit the rolling of a wheel on said body, with a penetrator plunger of hardened metal slidably mounted in said bore and projecting from the top of said bore, said plunger being formed with a partially spherical surface at its lower end, and said body having a recess in its lower end communicating with said bore, with a test piece housed in said recess, said test piece comprising a metal strip of predetermined hardness formed with an offset intermediate its ends and provided with an aperture at the end spaced from said plunger, and a threaded member located in a threaded bore in said body and having a head, said head and the offset end of said test piece being housed in said recess, and the opposite end of said test piece extending under said plunger and being adapted to rest against a rail, whereby the rolling of a wheel of a locomotive on the projecting end of said plunger will produce a predetermined deformation in said test piece which is an indication of the applied weight of the locomotive at said wheel, said test piece being provided with indicia at the point of engagement of said plunger with said test piece, for indicating the weight, corresponding to depressions of predetermined size.

3. In a weight-determining device for locomotives, the combination of a hardened metal body provided with a guide bore and having sloping surfaces at its ends to permit the rolling of a wheel on said body, with a penetrator plunger of hardened metal slidably mounted in said bore and projecting from the top of said bore, said plunger being formed with a partially spherical surface at its lower end, and said body having a recess in its lower end communicating with said bore, with a test piece housed in said recess, said test piece comprising a metal strip of predetermined hardness formed with an offset intermediate its ends and provided with an aperture at the end spaced from said plunger, and a threaded member located in a threaded bore in said body and having a head, said head and the offset end of said test piece being housed in said recess, and the opposite end of said test piece extending under said plunger and being adapted to rest against a rail, whereby the rolling of a wheel of a locomotive on the projecting end of said plunger will produce a predetermined deformation in said test piece which is an indication of the applied weight of the locomotive at said wheel, said head being of non-circular shape, and said bore in said test piece having a similar radially displaced non-circular aperture whereby the head may be turned or the test piece may be turned for removal of the test piece without removing said bolt.

JAMES H. EDWARDS.